US00RE38005E

(19) United States

(12) Reissued Patent

Schubert et al.

(10) Patent Number: US RE38,005 E

(45) Date of Reissued Patent: Feb. 25, 2003

(54) MULTI-USER DIGITAL LASER IMAGING SYSTEM

(75) Inventors: Paul C. Schubert, Marine on St. Croix, MN (US); Richard R. Lemberger, Forest Lake, MN (US); Terrence H. Joyce, Lakeville, MN (US); Todd G. Langmade, Mahtomedi, MN (US)

(73) Assignee: Eastman Kodak Company, Rochester, NY (US)

(21) Appl. No.: 09/001,595

(22) Filed: Dec. 31, 1997

Related U.S. Patent Documents

Reissue of:

(64) Patent No.: 5,481,657
Issued: Jan. 2, 1996
Appl. No.: 08/336,731
Filed: Nov. 3, 1994

U.S. Applications:

(63) Continuation of application No. 07/981,075, filed on Nov. 25, 1992, now abandoned.

(51) Int. Cl.[7] ..... G09G 1/00

(52) U.S. Cl. ..... 345/418

(58) Field of Search ..... 345/418, 428, 345/302, 429, 433

(56) References Cited

U.S. PATENT DOCUMENTS 4,310,234 A * 1/1982 Sakamoto et al. ..... 345/418
4,510,011 A * 4/1985 Azuma et al. ..... 156/407
4,530,011 A * 7/1985 Haddick ..... 386/130
4,700,058 A * 10/1987 Belanger et al. ..... 250/205
4,730,214 A * 3/1988 Lambert et al. ..... 348/189
4,751,377 A * 6/1988 Ishizaka et al. ..... 250/205
4,757,334 A * 7/1988 Volent ..... 355/27
4,766,503 A * 8/1988 Lambert et al. ..... 386/9
4,780,744 A * 10/1988 Porter et al. ..... 399/39
4,783,588 A * 11/1988 Schmidt et al. ..... 235/467
4,791,282 A * 12/1988 Schmidt et al. ..... 235/462
4,805,013 A * 2/1989 Dei et al. ..... 358/523
4,812,861 A * 3/1989 Sasaki et al. ..... 396/548
4,816,863 A * 3/1989 Lee ..... 399/51
4,819,190 A * 4/1989 Hinman et al. ..... 395/118
4,831,626 A * 5/1989 Watanabe et al. ..... 372/29
4,922,335 A * 5/1990 Outa et al. ..... 358/506
5,117,119 A * 5/1992 Schubert et al. ..... 250/559.02
5,229,585 A * 7/1993 Lemberger et al. ..... 235/375
5,273,038 A * 12/1993 Beavin ..... 600/416
5,281,979 A * 1/1994 Krogstad ..... 346/108
5,321,524 A * 6/1994 Yanagita ..... 358/455

OTHER PUBLICATIONS

H. W. Bodmann, "A Unified Relationship Between Brightness and Luminance", CIE Proceedings, Kyoto Session 1979 (CIE Central Bureau, Paris 1980).*

* cited by examiner

*Primary Examiner*—Cliff N. Vo

(74) *Attorney, Agent, or Firm*—William F. Noval

(57) ABSTRACT

A multi-user digital laser imaging system for imaging film from bar coded cartridges as a function of image values representative of the images to be printed. The imaging system includes memory for storing transfer functions and film models for each of several users. The transfer functions characterize the relationships between image values and expected imaged film transmittance quantities. The film models characterize the relationship between the transmittance quantities and laser drive values that will provide the appropriate film exposure. An image management subsystem generates lookup tables characterizing the relationship between image values and laser drive values on the basis of user-selected transfer functions and film models selected by the system through the use of film identification information read from the bar code. During imaging operations the image management subsystem accesses the lookup tables as a function of the image values to obtain the appropriate laser drive values. The transfer functions can be modified to accommodate user preferences. Test wedge calibration procedures are periodically implemented to correlate the film models to measured sensitometric characteristics. Density patch calibration procedures are performed during each imaging operation to correct for drifts caused by the film developing subsystem.

84 Claims, 6 Drawing Sheets

MULTI-USER DIGITAL LASER IMAGING SYSTEM

Matter enclosed in heavy brackets [ ] appears in the original patent but forms no part of this reissue specification; matter printed in italics indicates the additions made by reissue.

*This is a Re-issue Application of U.S. Pat. No. 5,481,657, issued Jan. 2, 1996.* This is a continuation of application Ser. No. 07/981,075 filed nov. 25, 1992, now abandoned.

BACKGROUND OF THE INVENTION

The present invention relates generally to medical laser imaging systems.

Laser imaging systems are commonly used to produce photographic images from digital image data generated by magnetic resonance (MR), computed tomography (CT) or other types of scanners. Systems of this type typically include a continuous tone laser imager for exposing the image on photographic film, a film processor for developing the film, and an image management subsystem for coordinating the operation of the laser imager and the film processor.

The image data is a sequence of digital image values representative of the scanned image. Image processing electronics within the image management subsystem processes the image values to generate a sequence of digital laser drive (i.e., exposure) values, each of which is representative of one of a plurality of intensity levels (e.g., a grey scale) at a discrete pixel location in the image. The image processing electronics scales and maps the range of scanned image values to a range of laser drive values which will produce a useful, continuous tone photographic image. This mapping operation is necessitated by the nonlinear relationship between the input values and their visual representation, and by the nonlinear sensitometric response of the photographic film to different intensities of light. The image management subsystems of laser imagers commercially available from 3M of St. Paul, Minn. include a plurality of stored lookup tables which characterize the relationship between the image values and laser drive values. Each lookup table is configured for one of several types of film and specific image characteristics such as contrast and the maximum and/or minimum densities of the final image. The selected lookup table for a given image is accessed by the image management subsystem as a function of the image values to determine the associated laser drive values.

In addition to selecting a desired lookup table, users of the commercially available 3M laser imagers can adjust the contrast and density levels on images by manually actuating controls interfaced to the image management subsystem. However, these adjustments are made on a trial and error basis with test patterns, an inconvenient and inefficient procedure. Furthermore, the user is only able to exercise a limited degree of control over the overall imaging system transfer function by selecting one of the lookup tables and adjusting the contrast and density ranges implemented by these lookup tables. This approach also fails to account for drifts in the overall system transfer function that can be caused by factors such as the depletion of developer chemicals and lot-to-lot variations between the ideal and actual film sensitometric characteristics.

It is evident that there is a continuing need for improved laser imaging systems. In particular, there is a need for a laser imaging system capable of automatically adapting to variations in media sensitometric characteristics and media development parameters. The system should also be capable of accommodating a greater degree of user control over the overall imaging system transfer function. Any such imaging system must of course be able to accurately and efficiently implement these functions to be commercially viable.

SUMMARY OF THE INVENTION

The present invention is a multi-user digital laser imaging system capable of automatically adapting to variations in media sensitometric characteristics, changes in user preferences and changes in the development process. In one embodiment the laser imaging system is configured to image film contained in a film receiving mechanism as a function of digital image values representative of an image, user commands, and film information characteristic of the film. The imager includes an image data input for receiving the digital image values, a user command input for receiving the user commands, and a film information input for receiving the film information. A laser scanner is responsive to digital laser drive values and capable of scanning a laser beam to image the film. Data characteristic of a plurality of transfer functions are stored in transfer function memory. Each transfer function is representative of the relationship between expected imaged film densities and associated image values. Data characteristic of a plurality of film models is stored in film model memory. Each film model is representative of the relationship between expected imaged film densities and associated laser drive values. RAM for storing digital data is also included. A digital processor is coupled to the image data input, user command input, film information input, laser scanner, transfer function memory, film model memory and RAM. The processor accesses the transfer function memory as a function of the user commands to select the data representative of user-desired transfer functions, and accesses the film model memory as a function of the film information to select data representative of the film models for film to be imaged. The processor generates lookup tables as a function of the selected transfer functions and film models, and stores the lookup tables in the RAM. The lookup tables are data characterizing relationships between the laser drive values and the image values. To image the film the processor accesses the laser drive values in the generated lookup tables as a function of the image values, and provides the accessed drive values to the laser scanner. This approach maintains the integrity of the system transfer function with little inconvenience to the user.

In another embodiment of the laser imager, the transfer function memory stores the transfer functions as data characterizing the relationship between a range of cubic roots of expected transmittance values of an image and associated image values. The film model memory stores the film models as data characterizing the relationship between a range of cubic roots of expected transmittance values of an image and associated film exposure values. The digital processor accesses the film model memory as a function of cubic root transmittance values to determine associated film exposure values, and computes laser drive values as a function of the determined film exposure values. The processor generates index tables of data characterizing the relationships between laser drive values and corresponding cubic root transmittance values, and stores the index tables in RAM. The lookup tables are generated by accessing the index tables as a function of desired cubic root transmittance values from selected transfer functions to create lookup tables of data characterizing relationships between the laser drive values and the image input values. Lookup tables can be quickly generated by this system, thereby enabling the convenient use of the system by several users, each of which has different user preferences.

In yet another embodiment, the imaging system includes a film processor for developing the imaged film, and a densitometer for providing information representative of the density of portions of the developed film. Test wedge memory is also included for storing test wedge data characteristic of test wedges. The test wedge data is representative of a range of laser drive values associated with expected film density values characterized by the film models. The digital processor is coupled to the film processor, densitometer and test wedge memory, and periodically executes wedge calibration procedures to correlate the film model being used with the current sensitometric characteristics of the film. During a wedge calibration procedure the processor accesses the test wedge memory and initiates the imaging of test wedges on the film as a function of the laser drive values. The test wedges on the imaged film are developed, and the actual density of the wedges measured by the densitometer. The processor compares the actual densities of the test wedges to the associated expected film density values. The processor then modifies the film model data as a function of the comparison so the film model corresponds to the actual characteristics of the film. Differences between the actual and ideal film sensitometric characteristics, such as those caused by lot-to-lot manufacturing variations and aging, are thereby corrected before the lookup tables are generated. Greater integrity in the overall imaging system transfer function is achieved through the use of this calibration procedure.

In another embodiment of the laser imaging system, the laser scanner includes an attenuator for adjusting the intensity of the scanned laser beam in response to attenuator control signals. Data characteristic of a density patch is also stored in density patch memory. The density patch data is representative of a digital laser drive value associated with an expected predetermined imaged and developed film density. The digital processor is coupled to the attenuator and density patch memory, and executes a density patch calibration procedure during the printing of each image. During density patch calibration procedures the processor accesses the density patch memory and initiates the imaging of a density patch on each film as a function of the laser drive value. After the imaged film is developed, the actual density the patch is measured by the densitometer. The actual density of the patch is compared to the associated expected film density value. The processor then generates attenuator control signals as a function of the patch comparison to minimize the differences between the measured and actual patch densities. Variations in the overall system transfer function, such as those caused by the depletion of the developer chemicals, between wedge calibrations, are thereby compensated.

Another embodiment of the imaging system has a control panel for receiving user-preference commands such as those describing desired image contrasts and maximum density levels. Before generating the lookup tables the processor modifies the selected transfer function on the basis of the user commands. Users therefore have the capability of customizing images to suit their own preferences. Furthermore, since the cubic root transmittance values stored in the transfer function memory are linearly related to the human brightness response, these modifications can be quickly performed by the processor through linear transformations.

DETAILED DESCRIPTION OF THE PREFERRED EMBODIMENTS

System Overview

Figure 1:
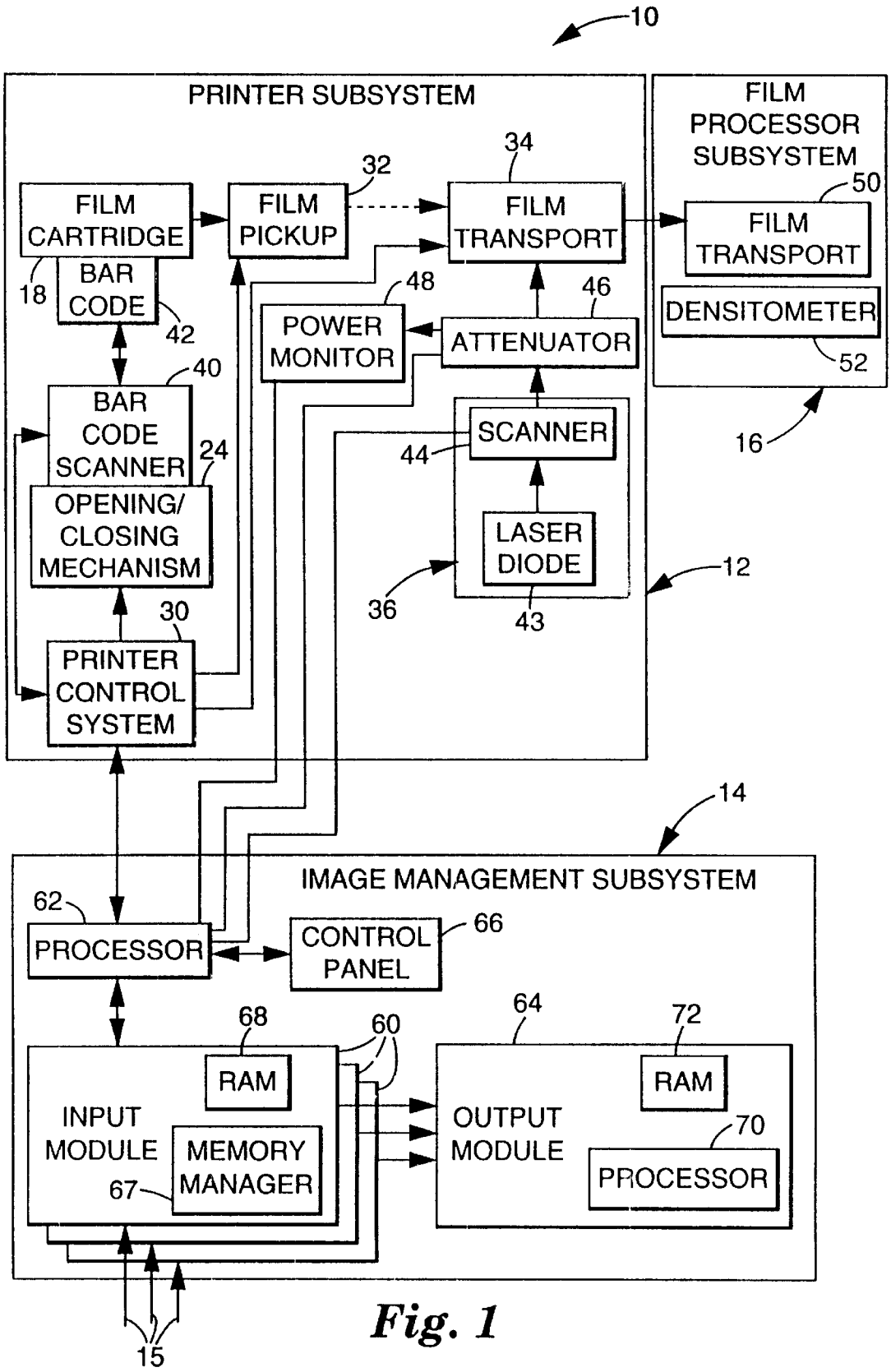
FIG. 1 is a block diagram of a multi-user laser imaging system in accordance with the present invention.

A multi-user digital laser imaging system 10 in accordance with the present invention is illustrated generally in FIG. 1. As shown, laser imaging system 10 includes laser diode printer subsystem 12, image management subsystem 14 and media processor subsystem 16. Printer subsystem 12 is a continuous tone laser imager in one embodiment, and is configured to receive resealable cartridges 18 which contain sheets of radiographic film (not separately shown). Image management subsystem 14 includes input ports 15 through which digital image values generated by a magnetic resonance (MR), computed tomography (CT) or other type of scanner are provided to imaging system 10. The image values are processed by image management subsystem 14 to generate laser drive values which are applied to printer subsystem 12 to image or expose film removed from cartridge 18. The printed film is subsequently developed by processor subsystem 16 to produce a hardcopy of the image. Imaging system 10 is capable of automatically adapting to variations in media, changes in user preferences, and changes in the media development parameters.

Image management subsystem 14 converts the raw image values into a sequence of digital laser drive values that are raster scan formatted for use by printer subsystem 12. This data processing operation makes use of lookup tables which characterize or map the relationship between the image values and the expected optical densities of those values on the imaged film (i.e., expected imaged film densities). During each imaging operation the image management subsystem 14 accesses the lookup table as a function of the image values to determine the associated laser drive values.

The lookup tables are generated by image management subsystem 14 using transfer functions and film models stored in memory. The transfer functions characterize relationships between the image values and the expected imaged film densities. The transfer function to be used for printing any given image is a matter of user preference. Image management subsystem 14 therefore includes memory for storing a number of transfer functions so the user can select the transfer function best suited for a particular image. The film models characterize the relationship between a range of laser drive values and the expected imaged film densities for each of a number of different types of film. The film model used to process the image values for a given image is automatically selected by image management subsystem 14 on the basis of received information identifying the particular type of film on which the image is to be printed.

If any given user is printing more than one image consecutively on the same type of film and using the same user specified commands (e.g., the same transfer function), the same lookup table may be used to print each image. However, if the next print request is from a different user, the user commands were changed, or a wedge calibration procedure (described below) is initiated by either the user or automatically by image management subsystem 14, a new and updated lookup table will be generated to print the image. Each time a new lookup table is to be generated, image management subsystem 14 does so in real time immediately prior to the imaging operation.

To facilitate the lookup table calculation operation as well as transfer function and film model modifications to be described below, information representing the expected imaged film densities in the transfer functions and film models is stored in the form of scaled cubic roots of the associated expected image film transmittance (i.e., expected imaged film densities >> (expected imaged film transmittance) $^{1/3}$). The cubic root transmittance values are designated as "T" quantities throughout the remainder of this description, and are approximately linearly proportional to the human brightness response. Because of this linear relationship to the human brightness response, the use of T quantities simplifies and reduces the time required to calculate lookup tables.

Lookup table generation operations involve the preliminary step of calculating index tables from the selected film models. The index tables characterize the relationship between laser drive values and corresponding expected imaged film T quantities. The function of the index tables is to effectively scale the film models to the then current operating characteristics of the laser scanning system and film and chemistry. Accordingly, the index tables are calculated from the film models on the basis of recently monitored maximum and minimum laser power levels and wedge calibration data. Once an index table has been calculated, the lookup table is generated by accessing the index table as a function of the T quantities of the selected transfer function to create an array of data which accurately maps the image values to laser drive values under current imaging system operating characteristics. Integrity of the system transfer function is thereby maintained with little inconvenience to the user.

Imaging system 10 allows users to customize certain image parameters. For example, depending on the nature of the image, certain users will prefer images with higher or lower contrasts. Users can also specify the maximum density ($D_{max}$) for an image. Ultrasound images, for example, are typically printed with a $D_{max}$ of about 2.0, while CT and MR images are often printed with a $D_{max}$ greater than 3. Since it is not possible to accommodate transfer functions for the whole spectrum of possible image densities and contrasts any particular user may occasionally use, much less those preferred by all the users, imaging system 10 accepts user commands to change image parameters such as contrast and $D_{max}$. Image management subsystem 14 implements these user commands, i.e. contrast and $D_{max}$, by selecting and/or linearly scaling the selected transfer functions on the basis of the user commands. This method of modifying the transfer functions to accommodate user preferences involves relatively simple, and therefore quick, mathematical operations. Similar transfer function modifications are performed when the user is attempting to image film having minimum and/or maximum density characteristics that are incompatible with the minimum and/or maximum T quantities stored in the selected transfer function.

Actual film sensitometric characteristics often vary from the "ideal" characteristics represented by the film models. These variations can be caused by a number of factors including lot-to-lot variations in the manufacturing process and age-induced degradation. Imaging system 10 periodically executes a wedge calibration procedure to compensate for these variations in film sensitometric characteristics. During a wedge calibration, image management subsystem 14 initiates the printing of a "test wedge" film. The test wedge is a set of single density patches, each printed with a given laser drive value corresponding to one of a range of desired image densities. The actual densities of the patches are compared to the expected imaged film densities for the given laser drive values (as characterized by the film models), and the film models modified to correspond to the actual film characteristics.

Characteristics of media processor subsystem 16 (e.g., the strength of the chemicals in the case of a wet processing system) also play a significant role in the reproducibility of overall system transfer function characteristics. These characteristics typically vary relatively slowly, over a period of hours or days depending on the rate at which imaging system 10 is used. To accommodate for these changes, image management subsystem 14 also executes a density patch calibration during each imaging operation. Density patch calibrations involve printing a single density patch on the top edge of each image. The single density patch is exposed using laser drive values expected to correspond to a mid-brightness density such as 1.0. The density of this patch is monitored by image management subsystem 14 after the image and patch are developed by processor subsystem 16. If the density of the patch has drifted from the nominal or expected density, image management subsystem 14 corrects for the drift by making adjustments to its laser scanning system. These and other features of laser imaging system 10 are described in greater detail below.

Laser Printing Subsystem

Figure 2:
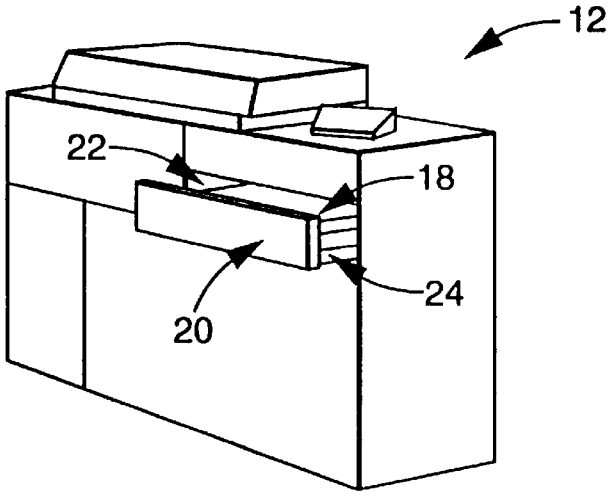
FIG. 2 is an illustration of one embodiment of the printer subsystem shown in FIG. 1.

Laser printer subsystem 12 is illustrated generally in FIG. 2. As shown, printer subsystem 12 includes a drawer 20 which is opened to provide access to a cartridge-receiving base 22 into which film cartridge 18 is loaded. An opening/closing mechanism 24 is mounted to drawer 20 for movement with respect to base 22. After film cartridge 18 has been loaded into base 22, drawer 20 is closed to seal the cartridge within a light-tight compartment. Opening/closing mechanism 24 is then actuated to open cartridge 18 so film can be removed therefrom, and to reseal the cartridge so it can be removed from printer subsystem 12 without damage to any remaining film. Cartridges. 18 containing different types and sizes of film can therefore be conveniently loaded into printer subsystem 12 as needed. A more detailed description of cartridges 18 and opening/closing mechanism 24 is found in the Lemberger et al. U.S. Pat. 5,132,724, entitled Opening And Closing Mechanism For A Laser Imager Film Cartridge, which is hereby incorporated by reference.

As shown in FIG. 1, laser printer subsystem 12 also includes microprocessor-based printer control system 30, film pickup mechanism 32, film transport mechanism 34, laser scanning system 36, and a bar code scanner 40 which is mounted to opening/closing mechanism 24. An optical bar code 42 is affixed to each cartridge 18. Bar codes 42 include machine readable information characteristic of the associated cartridges and the film therein. In one embodiment, the information encoded on bar codes 42 includes a unique cartridge identification, cartridge manufacturing history, film type and film size.

Printer control system 30 coordinates and controls the operation of printer subsystem 12, and interfaces the printing subsystem with image management subsystem 14. After a film cartridge 18 has been loaded into printer subsystem 12, control system 30 actuates opening/closing mechanism 24 to open cartridge 18 while scanner 40 is simultaneously driven across bar code 42. Information read from the bar code 42 is transferred to image management subsystem 14 and also used by printer control system 30. Film pickup mechanism 32 removes sheets of film from cartridge 18 and positions the sheets on film transport mechanism 34. Film transport mechanism 34 drives the film through an imaging station (not separately shown) under the control of printer control system 30. Image management subsystem 14 and printer control system 30 cause laser scanning system 36 to expose the film as the film is being driven through the imaging station.

Laser scanning system 36 includes laser diode 43, rotating mirror scanner 44, attenuator 46 and power monitor 48. Laser diode 43 is connected to receive the digital laser drive values from image management subsystem 14, and generates an intensity modulated laser beam as a function of the laser drive values. The modulated laser beam is raster scanned across the film by scanner 44. Small adjustments to the intensity of the laser beam are made by attenuator 46 in response to control signals from image management subsystem 14. In one embodiment, attenuator 46 is a rotating polarizing filter such as that disclosed in the Sasaki et al. U.S. Pat. No. 4,812,861. Power monitor 48 is also coupled to image management subsystem 14 and includes a photodiode positioned to intercept a portion of the scanning laser beam at a location close to the plane on which the film is imaged. Information provided by power monitor 48 is used in a manner described more fully below to scale the laser drive values and achieve the appropriate ranges of exposures.

The imaged film is transferred to processor subsystem 16 for development. Processor subsystem 16 can be a wet chemical or thermal processor depending on the nature of the film being imaged, and includes a transport mechanism 50 and a densitometer 52. Transport mechanism 50 drives the film through processor subsystem 16 as the film is being developed. Densitometer 52 can be embodied in the form shown in the Lemberger et al. U.S. Pat. 5,117,119 entitled Auto-Ranging Film Densitometer. As is described in greater detail below, image management subsystem 14 initiates the printing of test wedges and/or density patches on the edges of film being imaged. The optical densities of the test wedges and density patches are measured by densitometer 52 after the film is developed, and information representative of these densities coupled to information management subsystem 14. Image management subsystem 14 uses the measured density information for calibration and control functions described below.

Image Management Subsystem

Image management subsystem 14 includes a plurality of input modules 60, processor 62, output module 64 and control panel 66. Each input module 60 is configured for use by one or two users of imaging system 10, and includes a memory management processor 67 and electrically programmable read only memory (EPROM) 68. Transfer functions and film models used by the users to which the input module 60 is assigned are stored in EPROM 68. Throughout the remainder of this description the term "transfer function memory" is used to refer to those portions of EPROM 68 in which the transfer function data is stored, and "film model memory" the portions of the EPROM in which the film models are stored. One embodiment of image management subsystem 14 includes sufficient EPROM 68 to store fifteen transfer functions and sixteen film models on each input module 60. Input modules 60 also include sufficient memory for storing image values for several queued images to be printed for the users assigned to the modules. Memory management processor 67 controls the storage of the transfer functions and film models within EPROM 68, and coordinates the transfer of data, including the image values, transfer functions, film models and lookup tables, between the input module 60, processor 62 and output module 64.

Processor 62 is interfaced to input modules 60, control panel 66 and output module 64 of image management subsystem 14, to bar code scanner 40, attenuator 46 and power monitor 48 of printer subsystem 12, and to densitometer 52 of media processor subsystem 16. Processor 62 controls the operations of image management subsystem 14, and coordinates the operations of the image management subsystem with those of printer subsystem 12 and media processor subsystem 16. Processor 62 also performs all processing operations associated with the generation of the lookup tables. In one embodiment, processor 62 is a Motorola 68030 processor with a math coprocessor and associated random access memory (not separately shown).

Output module 64 includes a processor 70 and random access memory (RAM) 72. Lookup tables generated by processor 62 are downloaded to RAM 72 for use during imaging operations. During the imaging operations, processor 70 accesses the lookup tables in real time as a function of the image values received from an input module 60. The laser drive values determined by accessing the lookup table are assembled by processor 70 in a raster scan format and applied to laser scanning system 36. Image processing functions such as size scaling and image rotation can also be performed by processor 70.

Transfer Function And Film Model Format

Figure 3:
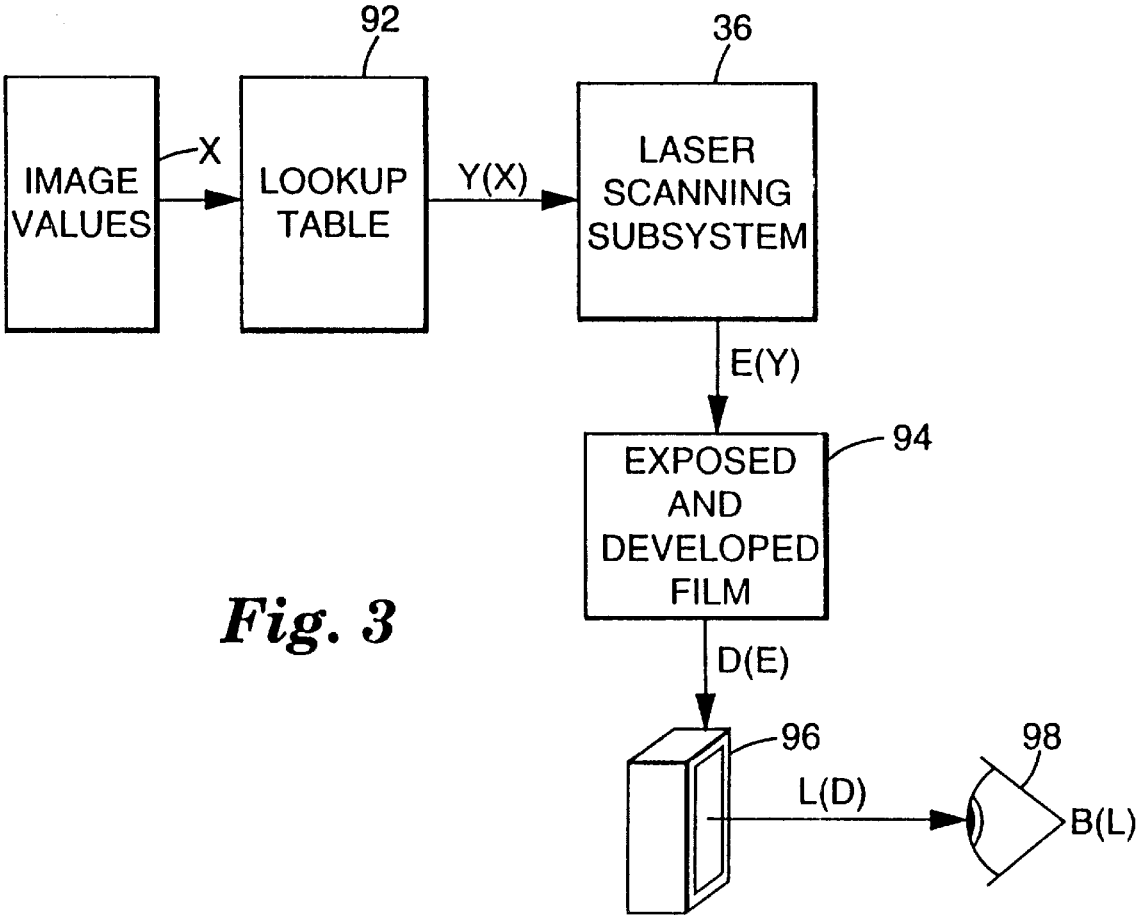
FIG. 3 is a graphic representation of the overall transfer function implemented by the laser imaging system combined with the brightness response induced in an observer.

FIG. 3 is a schematic representation of the overall imaging system transfer function combined with the response induced in an observer. The sequence of transformations of the information is as follows. Image values X are transformed into laser drive values Y(X) by image management subsystem 14 using the lookup table 92. The laser drive values Y are applied to the laser scanning subsystem 36 which changes them to exposure values E(Y). The exposed and developed film 94 render the exposure values into film densities D(E). Although the operations of laser imager 10 are completed at this point, the sequence of transformations can be extended. The imaged film is placed in a light box 96 to produce luminance values L(D). Finally, the luminance values elicit a brightness response B(L) from an observer 98. The chain of transformations which occurs between the raw image values and the brightness responses of the observers can be characterized as B(L(D(E(Y(X))))).

The transformation B(L) from image luminance to brightness response can be expressed, to the first order and for simple responses, in the form $B=aL^p-B_0$, where a and $B_0$ are dependant on viewing surround conditions. H. W. Bodmann et al., A Unified Relationship Between Brightness And Luminance, CIE Proceedings, Kyoto Session 1979 (CIE Central Bureau, Paris 1980), pp. 99–102. This reference and others have shown that the exponent p is roughly equal to ⅓. Based on this analysis, if the output of imaging system 10 is taken as the diffuse image transmittance raised to the ⅓ power (i.e., the cubic root) the parameters characterizing the imaging system output are approximately linearly proportional to the observer's human brightness response. Image management system 14 makes use of this relationship by storing data representative of expected imaged film densities in the transfer function memory and film model memory in terms of associated transmittance quantities $T=(\text{transmittance})^{1/3}$. A significant benefit of storing the transfer functions and film models in terms of transmittance quantities T is that it enables processor 62 to perform linear transformations during the transfer function modifications described below.

Figure 4:
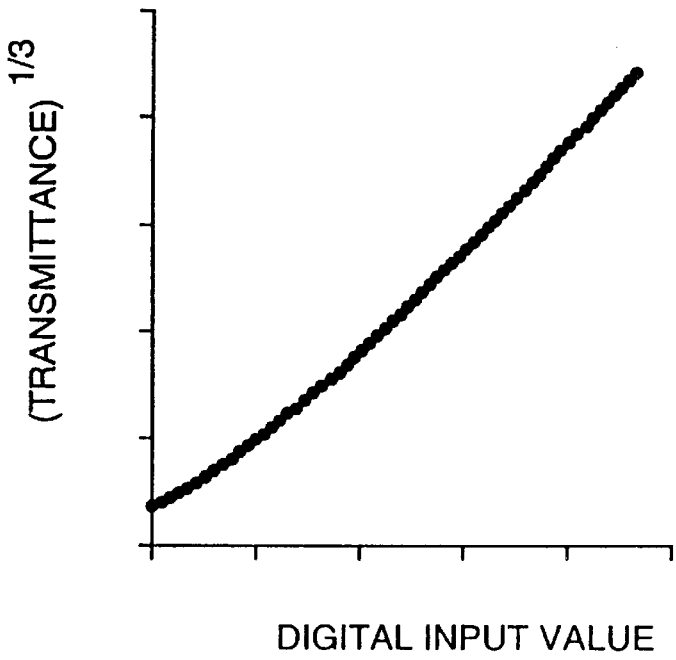
FIG. 4 is a graphic representation of the manner by which transfer functions are stored in memory of the imaging system.

Transfer functions describe the functional relationship between image values and associated expected imaged film densities. In the embodiment of image management subsystem 14 described above, each of the fifteen transfer functions per input module 60 are stored in EPROM 68 as arrays of numbers denoted TF(i). The indexes i are equal to the image values (scaled appropriately for the image data word size). The numbers TF(i) are the associated transmittance quantities T described immediately above. FIG. 4 is a graphical representation of a transfer function stored in EPROM 68.

Figure 5:
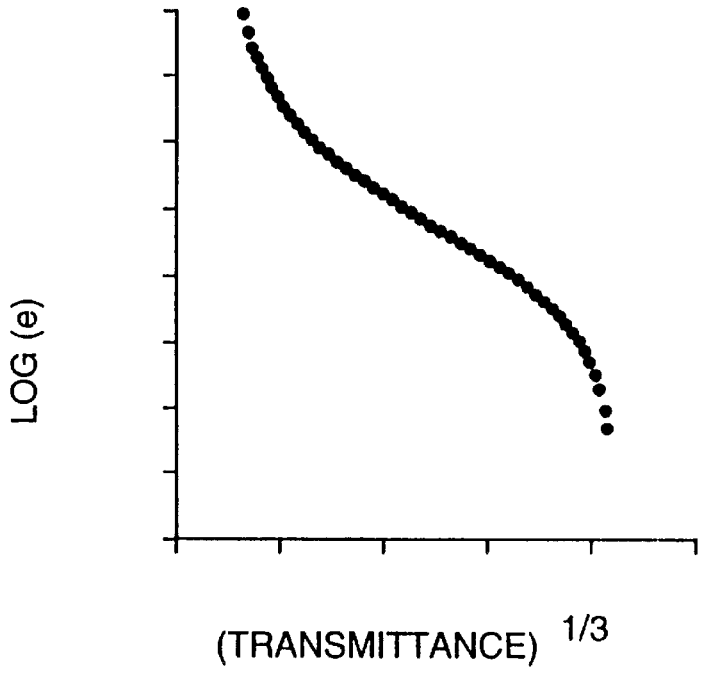
FIG. 5 is a graphic representation of the manner by which film models are stored in the memory of the imaging system.

Film models describe the functional relationship between expected imaged film densities and associated film exposure values. In the embodiment of image management subsystem 14 described above, each of the sixteen film models per input module 60 are stored in EPROM 68 as arrays denoted FM(i). The indexes i are equal to the scaled transmittance quantities T. The numbers FM(i) are the associated scaled logarithms of the desired exposure, log(E). Specifically, the exposure values E are normalized to the exposure required to print the maximum allowable film density, $D_{max}$, so $e=E/E_{Dmax}$. These normalized exposure values are referred to as e in subsequent portions of this description. By way of example, for a film type having a maximum image density of 3.2, the film model contains log(e)=0 (corresponding to e=1) at the address corresponding to D=3.2 FIG. 5 is a graphical representation of a film model stored in EPROM 68.

Lookup Table Generation

Lookup tables are generated as a function of the transfer function and film model selected for a particular image to be printed. The transfer function is selected by the user through control panel 66. The film model is automatically selected by image management subsystem 14 using the film identification information read from the bar code 42 of the film cartridge 18 currently loaded in imaging system 10.

Figure 6:
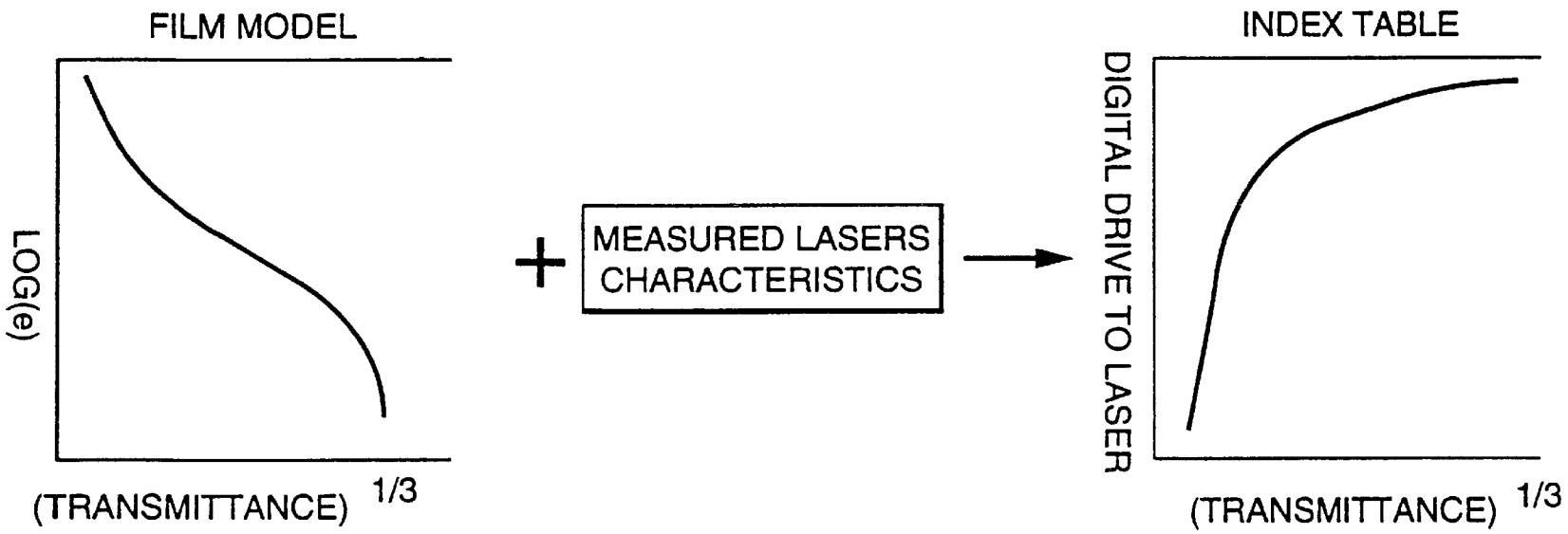
FIG. 6 is a graphic representation of the manner by which index tables are calculated from the film models and stored in memory of the imaging system.

The generation of each lookup table involves the intermediate step of generating an index table to correlate normalized exposure values e to the current dynamic power range of laser diode 43. Accordingly, the index table is a array IT(i). The index is equivalent to the transmittance quantities T. The values IT(i) are the associated 12 bit digital laser drive values that will provide the proper film exposure to achieve that transmittance quantity. FIG. 6 includes a graphic representation of an index table.

As shown in FIG. 6, index tables are calculated from the film models using measured information indicating the current operating characteristics of laser diode 43. The maximum and minimum power output levels of laser diode 43, $P_{max}$ and $P_{min}$, respectively, vary over time. These variations can be caused by such factors as changes in the temperature of laser diode 43 and by aging of the device. During each wedge calibration procedure (described in greater detail below), image management subsystem 14 uses power monitor 48 to measure $P_{max}$ and $P_{min}$ at the film imaging plane. Image management subsystem 14 uses the log(e) values in the film model to compute digital laser drive values IT for the film model in accordance with the equation $IT=4095\ (1-10^{log(e)})$, where $R=P_{max}/P_{min}$.

Image management subsystem 14 also calibrates laser scanning system 36 by setting attenuator 46 so $P_{max}$ outputs by laser diode 43 provide log(e)=0 (i.e., will print the maximum image density of the film). A scaling operation is also performed by image management subsystem 14 so $P_{max}$ outputs by laser diode 43 are produced by laser drive values of 0, and $P_{min}$ outputs are produced by laser drive values of 4095. When scaled in this manner the highest laser drive values correspond to the brightest areas on the image, and the lowest laser drive values the darkest areas.

Figure 7:
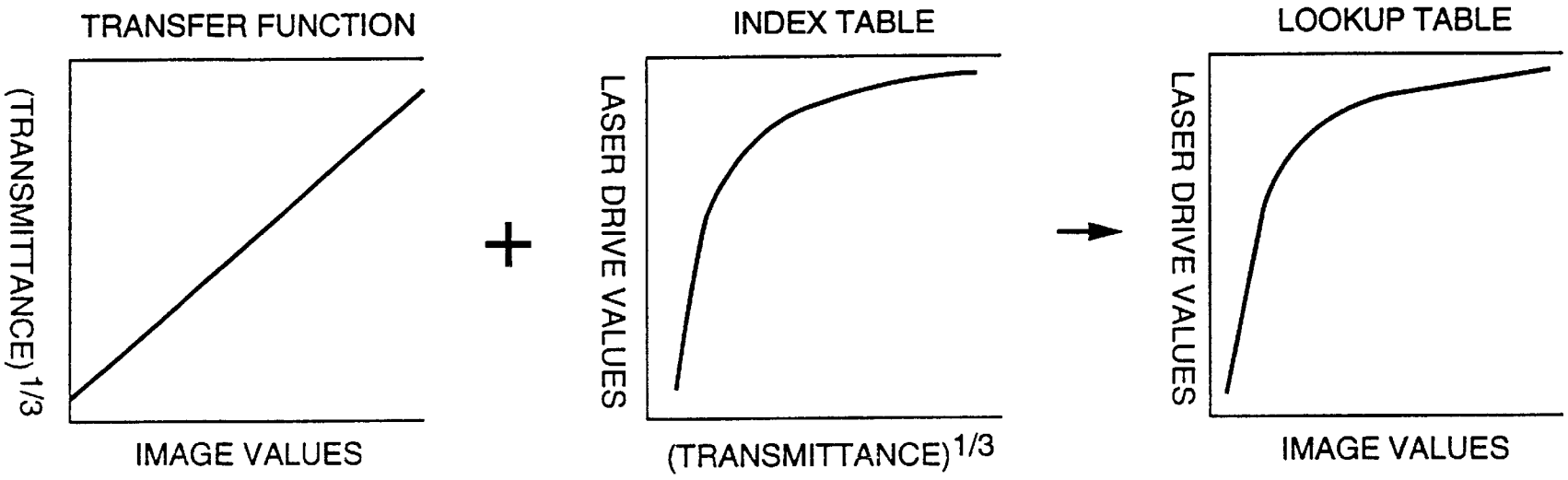
FIG. 7 is a graphic representation of the manner by which the imaging system generates the lookup tables from the transfer functions and the index tables.

Once the index table has been generated in the manner described above, image management subsystem 14 creates the lookup table by a simple indexing operation illustrated graphically in FIG. 7. The selected transfer function is accessed as a function of each image value to determine the associated T quantity. The index table is then accessed as a function of each T quantity to determine the associated laser drive value. Image management subsystem 14 need not perform any mathematical operations during this lookup table generating operation. The process of converting the image values to corresponding digital drive values is a simple, and therefore quick, indexing operation using the lookup table. This approach to generating the lookup tables also results in overall system transfer functions having a high degree of integrity since the tables are based on user-selected transfer functions and appropriate film models.

Transfer Function Modifications

As mentioned above, imaging system 10 allows users to change certain image parameters such as contrast and $D_{max}$. User preferences of these types are keyed into system 10 through control panel 66. Image management subsystem 14 accommodates these changes by selecting and/or modifying the transfer function.

Figure 8A:
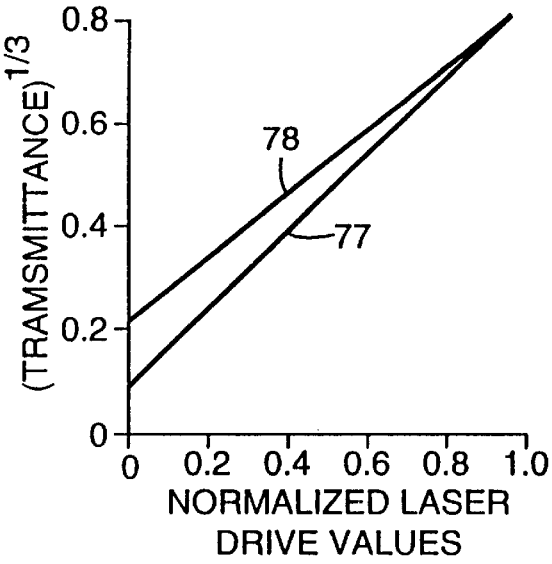
FIGS. 8(a–b) is a graphic representation of modified transfer functions in the form of the linear (transmittance) $^{1/3}$ quantities by which the transfer functions are stored in the imaging system, and in the form of nonlinear density quantities, for purposes of comparison.
Figure 8B:
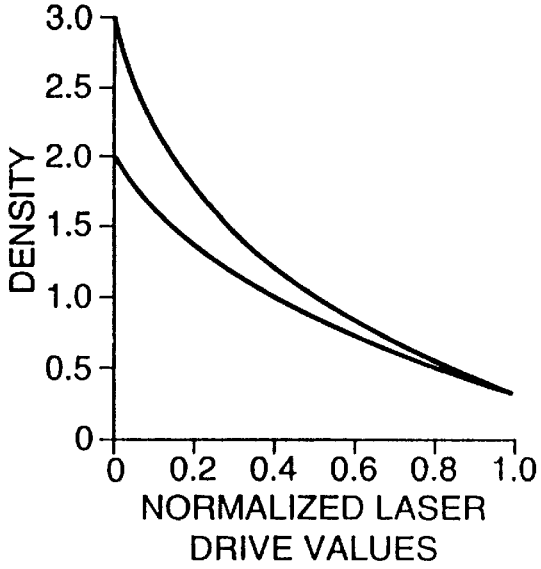

Since the transfer functions are stored in the form of transmittance quantities T which are assumed to be a roughly linear function of brightness response, the transfer function modifications are computed as linear transformations. These calculations can be performed simply and quickly by processor 62. The nature of a transfer function modified through linear transformations to increase $D_{max}$ from 2.0 to 3.0 is illustrated in FIG. 8. From this Figure it is evident that the final transfer function 77 varies from the initial transfer function 78 only in slope and intercept. On the other hand, the modification of the corresponding density-based transfer function is not a linear transformation, and would involve more complicated mathematical calculations.

Transfer functions are also modified by image management subsystem 14 when a user attempts to image film having $D_{max}$ and/or $D_{min}$ characteristics that are incompatible with the maximum and/or minimum T quantities stored in the selected transfer functions. This modification is also performed by simple linear transformations of the transfer functions. The ability to quickly modify transfer functions in this manner enables imaging system 10 to accommodate a wide range of user preferences with relatively little loss in system imaging throughout.

Wedge Calibration Procedure

For a variety of reasons including lot-to-lot manufacturing variations and age, the "ideal" film models stored in EPROM 68 may not accurately represent the actual film characteristics at any given time. Image management subsystem 14 performs wedge calibration procedures to adjust the film models in such a manner that they describe the actual characteristics of the film. A wedge calibration procedure is executed whenever: (1) a cartridge 18 containing a new lot of film is loaded into laser imager 10 (as determined from information read from the cartridge bar code 42); (2) the time between the printing of two consecutive images will exceed a predetermined time period such as 8 hours; (3) the density patch calibration procedure described below indicates that an unacceptably large shift in exposure is required to achieve the nominal patch density; or (4) a user requests a calibration by actuating the control panel 66.

To facilitate the wedge calibration procedures, a range of laser drive values (i.e., test wedge laser drive values) corresponding to a range of expected film density values are stored in system EPROM. During a wedge calibration procedure image management subsystem 14 drives the laser scanning system 36 with the test wedge laser drive values to image a sequence of density patches (i.e., test wedges) on a sheet of film. The imaged film including the test wedges is developed by processor subsystem 16, and the actual densities of the test wedges measured by densitometer 52. Processor 62 compares the measured densities of the test wedges to information representative of the expected film density values stored in the film model for the imaged film. If any discrepancies are noted between the measured and expected film density values, the stored log(e) values of the film model are linearly transformed to conform to the measured log(e) values.

Figure 9:
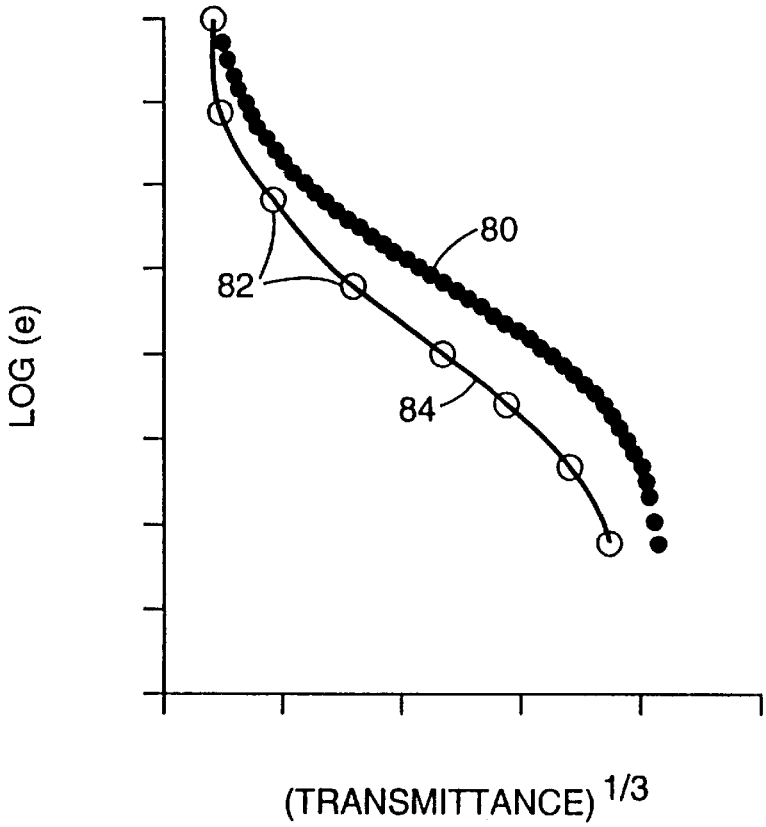
FIG. 9 is a graphic representation of ideal and modified film models.

FIG. 9 is a graphic representation of a film model 80 stored in EPROM 68. Also shown for purposes of example are the measured densities (T quantities) 82 from eight wedge patches. Lines are drawn between the measured test wedge values to indicate the piecewise linearly modified film model 84 created by image management subsystem 14 during the wedge calibration procedure. Following the wedge calibration procedure, and until another such calibration procedure is executed, image management subsystem 14 will continue to use the modified film model in place of the "ideal" model. Depending on the degree of accuracy required from the film models, a greater number of test wedge laser drive values can be used, and/or more complicated non-linear curve fitting algorithms used to interpolate the points on the modified film model 84 between the sampled T quantities. Modifying the film models in this manner prior to lookup table generation increases the accuracy of the overall system transfer function.

Density Patch Calibration Procedure

Density patch calibration procedures are executed by image management subsystem 14 to compensate for relatively long term drift in the overall transfer function of imaging system 10. Drifts of this type occur over periods from hours to days, and are caused mainly by changing characteristics of processor subsystem 16 (e.g., by developer consumption). Image management subsystem 14 executes the density patch calibration procedure during the imaging of each sheet of film, and compensates for drifts by adjusting attenuator 46 of laser scanning system 36.

System EPROM includes stored density patch information representative of a laser drive value associated with a predetermined patch density. In one embodiment the predetermined patch density is 1.0, corresponding roughly to mid-brightness on an image. The density patch calibration procedure involves accessing the laser drive value from system EPROM during each imaging operation, and using this information to print a single density patch on the top edge of the film. The film is then developed by processor subsystem 16, and the density of the patch measured by densitometer 52. Processor 62 compares the measured density to the expected image density for the laser drive value (as determined from the appropriate film model), and controls the attenuator as a function of the comparison to minimize the differences in density during subsequent density patch calibration procedures. In one embodiment, the attenuator is not adjusted unless the absolute value of the difference between the measured patch density and he expected density is greater than a first predetermined value. A set first amount of attenuator correction is made for all absolute value density differences between the first predetermined value and a second predetermined value. Similarly, a second and greater amount of attenuator correction is made for all absolute value density differences greater than the second value. Furthermore, if the density difference is greater than a third predetermined value, image management subsystem 14 initiates a test wedge calibration procedure. The attenuator corrective actions can be easily and effectively performed without the need to calculate lookup tables by quantizing the actions in this manner. Density patch calibrations further increase the integrity of the overall system transfer function.

Conclusion

Imaging system 10 is capable of adapting automatically to changes in media, changes in user preferences and changes in media development parameters. Integrity of the system transfer functions are therefore maintained with little inconvenience to the user. The manner in which the lookup tables are calculated enables this operation to be quickly performed, thereby facilitating the convenient use of the imaging system by several users. A wide range of user preferences is also accommodated.

Although the present invention has been described with reference to preferred embodiments, those skilled in the art will recognize that changes may be made in form and detail without departing from the spirit and scope of the invention.

What is claimed is:

1. A digital laser imaging system for imaging film contained in a film receiving mechanism as a function of digital image values representative of an image, user commands, and film information that is characteristic of said film, comprising:

image data input means for receiving said digital image values;

user command means for receiving said user commands;

film information input means for receiving said film information;

laser scanning means, responsive to digital laser drive values, for scanning a laser beam to image said film;

transfer function memory for storing data characteristic of a plurality of transfer functions, each transfer function representative of a relationship between expected imaged film densities and associated digital image values;

film model memory for storing data characteristic of a plurality of film models, each film model representative of a relationship between expected imaged film densities and associated laser drive values;

RAM for storing digital data; and a digital processor coupled to the image data input means, user command means, film information input means, laser scanning means, transfer function memory, film model memory and RAM, and including means for:

accessing the transfer function memory as a function of said user commands to select the data representative of user-desired transfer functions;

accessing the film model memory as a function of the film information to select data representative of the film models for film to be imaged;

generating, and storing in the RAM, lookup tables of data characterizing relationships between the laser drive values and the digital image values as a function of the selected transfer functions and film models; and accessing laser drive values in the generated lookup tables as a function of the digital image values, and providing the accessed laser drive values to the laser scanning means to image the film.

2. The digital laser imaging system of claim 1 wherein:

the transfer function memory stores the transfer functions as data characterizing a relationship between a range of expected transmittance values of an image and associated image values;

the film model memory stores the film models as data characterizing a relationship between a range of expected transmittance values of an image and associated film exposure values; and the digital processor further includes means for:

accessing the film model memory as a function of transmittance values to determine associated film exposure values;

computing laser drive values as a function of the determined film exposure values;

generating, and storing in RAM, index tables of data characterizing relationships between laser drive values and corresponding transmittance values; and generating the lookup tables by accessing the index tables as a function of desired transmittance values from selected transfer functions to create lookup tables of data characterizing relationships between the laser drive values and the image input values.

3. The digital laser imaging system of claim 2 wherein the transfer function memory and the film model memory each store the data representative of film transmittance values in a form representative of human brightness response.

4. The digital laser imaging system of claim 3 wherein the transfer function memory and the film model memory each store the data representative of film transmittance values in the form of cubic roots of the film transmittance values.

5. The digital laser imaging system of claim 2 wherein the film model memory stores the film exposure values in the form of logarithms of the exposure values.

6. The digital laser imaging system of claim 1 and further comprising:

a film processor for developing the imaged film;

a densitometer for providing information representative of the density of portions of the developed film;

test wedge memory for storing test wedge data that is characteristic of test wedges, the test wedge data being representative of a range of laser drive values associated with expected film density values characterized by the film models; and wherein the digital processor is coupled to the film processor, densitometer and test wedge memory, and further comprises test wedge calibration means having:

test wedge print initiation means for accessing the test wedge memory and initiating the imaging of test wedges on film as a function of the laser drive values;

test wedge processing means for causing the test wedges on the imaged film to be developed, and for causing the densitometer to provide information representative of actual densities of the developed test wedges;

wedge comparison means for comparing the actual densities of the test wedges to the associated expected film density values; and film model modification means for modifying the film model data as a function of the comparison so the film model corresponds to the actual character.

7. The digital laser imaging system of claim 6 and further comprising operator-responsive calibration request input means coupled to the digital processor for actuating the test wedge calibration means.

8. The digital laser imaging system of claim 6 wherein the digital processor further comprises means for actuating the test wedge calibration means when a new lot of film has been loaded into the film receiving mechanism.

9. The digital laser imaging system of claim 6 wherein the digital processor further comprises means for actuating the test wedge calibration means when an elapsed period of time since a most recently imaged film exceeds a predetermined period of time.

10. The digital laser imaging system of claim 6 wherein:

the laser scanning means further comprises an attenuator for adjusting the intensity of the scanned laser beam in response to attenuator control signals;

the digital laser imaging system further comprises density patch memory for storing data characteristic of a density patch, the density patch data representative of a digital laser drive value associated with an expected predetermined imaged and developed film density; and the digital processor is coupled to the attenuator and density patch memory and further comprises density patch calibration means having:

density patch calibration initiation means for accessing the density patch memory and initiating the imaging of a density patch on each film as a function of the laser drive data;

density patch processing means for causing the density patch on the imaged film to be developed by the film processor, and for causing the densitometer to provide information representative of the actual density of the developed patch;

patch comparison means for comparing the actual density of the patch to the associated expected film density value; and attenuator control means for generating attenuator control signals as a function of the patch comparison.

11. The digital laser imaging system of claim 10 wherein the digital processor further includes means for actuating the test wedge calibration means as a function of the comparison.

12. The digital laser imaging system of claim 1 wherein:

the film receiving mechanism comprises a mechanism for receiving cartridges of film bearing the film information in machine readable form; and the film information input means comprises a reading mechanism for reading the film information on the cartridge.

13. The digital laser imaging system of claim 12 wherein:

the film receiving mechanism further comprises a mechanism for receiving cartridges of film bearing bar coded film information; and the film information input means further comprises a bar code reader.

14. The digital laser imaging system of claim 12 wherein:

the film information input means is configured to receive information representative of film type; and the digital processor accesses the film model memory and selects film models as a function of the film type information.

15. The digital laser imaging system of claim 1 wherein:

the transfer function memory comprises memory for storing data characteristic of transfer functions representing a plurality of image contrasts;

the user command means is configured to receive user commands representative of a desired image contrast; and the digital processor accesses the transfer function memory and selects transfer functions as a function of the desired image contrast information.

16. The digital laser imaging system of claim 1 wherein:

the transfer function memory comprises means for storing the transfer functions in the form of data representative of ranges of film transmittance values as a function of associated image input values; and the digital processor further comprises means for generating, and storing in RAM, user-customized transfer functions as a linear transformation of the accessed transfer functions and as a function of user commands received at the user command means.

17. The digital laser imaging system of claim 16 wherein:

the user command means is configured to receive user commands representative of desired maximum image densities; and the digital processor further comprises means for generating, and storing in RAM, user-customized transfer functions as a linear transformation of the accessed transfer functions, and as a function of the user commands representative of desired maximum image densities.

18. The digital laser imaging system of claim 1 wherein the system further comprises a plurality of input modules and wherein the transfer function memory is associated with the input modules, wherein each input module is configured to provide access to the system by an associated user, and the transfer function memory associated with the input module includes memory for storing a plurality of user-specific transfer functions used by the associated user.

19. The digital laser imaging system of claim 18 wherein the film model memory is associated with the input modules, and wherein the film model memory associated with each input module includes memory for storing a plurality of film models used by the associated user.

20. A digital laser imaging system for imaging film as a function of digital image values representative of an image, user commands, and film information that is characteristic of said film, comprising:

image data input means for receiving said digital image values;

user command means for receiving said user commands;

film receiving means for receiving cartridges of said film bearing the film information in machine readable form;

film information reading means for reading the film information from cartridges loaded into the film receiving means;

laser scanning means, responsive to digital laser drive values, for scanning a laser beam to image said film;

a film processor for developing imaged film;

a densitometer for providing information representative of the density of portions of the developed film;

transfer function memory for storing data characteristic of a plurality of transfer functions, each transfer function representative of a relationship between expected imaged film densities and associated digital image values;

film model memory for storing data characteristic of a plurality of film models, each film model representative of a relationship between expected imaged film densities for a particular type of film and associated laser drive values;

test wedge memory for storing test wedge data that is characteristic of test wedges, the test wedge data being representative of a range of laser drive values associated with expected film density values characterized by the film models;

RAM for storing digital data; and a digital processor including means for:

accessing the transfer function memory as a function of said user commands to select user-desired transfer functions;

accessing said film model memory as a function of film information read from cartridges to select film models for film to be imaged;

accessing said test wedge memory and initiating the imaging of test wedges on film;

causing test wedges on the imaged film to be developed by said film processor;

causing said densitometer to provide information representative of the actual density of the developed test wedges;

comparing the actual densities of the test wedges to the associated expected film density values;

modifying data in said film model memory as a function of the comparison so the film model corresponds to the actual characteristics of the film;

generating, and storing in the RAM, lookup tables of data characterizing relationships between the laser drive values and the digital image values as a function of the selected transfer functions and film models; and accessing laser drive values in the generated lookup tables as a function of the image values, and providing the accessed laser drive values to the laser scanning means to image the film.

21. The digital laser imaging system of claim 20 and further comprising operator-responsive calibration request input means coupled to the digital processor for initiating the imaging and processing of the test wedge.

22. The digital laser imaging system of claim 20 wherein the digital processor further comprises means for initiating the imaging and processing of a test wedge when film information read from the cartridge indicates that a cartridge containing a new lot of film has been loaded into the film receiving means.

23. The digital laser imaging system of claim 20 wherein the digital processor further includes means for initiating the imaging and processing of a test wedge when an elapsed period of time since a most recently imaged film exceeds a predetermined period of time.

24. The digital laser imaging system of claim 20 wherein:

the laser scanning means further comprises an attenuator for adjusting the intensity of the laser beam in response to attenuator control signals;

the digital laser imaging system further comprises density patch memory for storing data characteristic of a density patch, the density patch data representative of the digital laser drive value associated with an expected predetermined imaged and developed film density; and the digital processor further comprises:

density patch calibration initiation means for accessing the density patch memory and initiating the imaging of a density patch on each film as a function of the laser drive data;

density patch processing means for causing the density patch on the imaged film to be developed by the film processor, and for causing the densitometer to provide information representative of the actual density of the developed patch;

patch comparison means for comparing the actual density of the patch to the associated expected film density value; and attenuator control means for generating attenuator control signals as a function of the patch comparison.

25. The digital laser imaging system of claim 24 wherein the digital processor further includes means for initiating the imaging and processing of test wedges as a function of the comparison.

26. The digital laser imaging system of claim 20 wherein:

the transfer function memory stores the transfer functions as data characterizing the relationship between a range of expected transmittance values of an image and associated image values;

the film model memory stores the film models as data characterizing the relationship between a range of expected transmittance values of an image and associated film exposure values; and the digital processor further comprises means for:

accessing the film model memory as a function of transmittance values to determine associated film exposure values;

computing laser drive values as a function of the determined film exposure values;

generating, and storing in RAM, index tables of data characterizing relationships between laser drive values and corresponding transmittance values; and generating the lookup tables by accessing the index tables as a function of desired transmittance values from selected transfer functions to create lookup tables of data characterizing relationships between the laser drive values and the image values.

27. The digital laser imaging system of claim 26 wherein the transfer function memory and the film model memory each store the data representative of film transmittance values in a form representative of human brightness response.

28. The digital laser imaging system of claim 27 wherein the transfer function memory and the film model memory each store data representative of film transmittance values in the form of the cubic roots of the film transmittance values.

29. The digital laser imaging system of claim 27 wherein the film model memory stores the film exposure values in the form of logarithms of the exposure values.

30. The digital laser imaging system of claim 20 wherein:

the film receiving mechanism comprises a mechanism for receiving cartridges of film bearing bar coded film information; and the film information reading means comprises a bar code reader.

31. The digital laser imaging system of claim 20 wherein:

the film information reading means is configured to receive information representative of film type; and the digital processor accesses the film model memory and selects film models as a function of the film type information.

32. The digital laser imaging system of claim 20 wherein:

the transfer function memory stores data characteristic of transfer functions representing a plurality of image contrasts;

the user command means is configured to receive user commands representative of a desired image contrast; and the digital processor accesses the transfer function memory and selects transfer functions as a function of the desired image contrast information.

33. The digital laser imaging system of claim 20 wherein:

the transfer function memory stores the transfer functions in the form of data representative of ranges of film transmittance values as a function of associated image input values; and the digital processor further comprises means for generating, and storing in RAM, user-customized transfer functions as linear transformations of the accessed transfer functions and as a function of user commands received at the user command means.

34. The digital laser imaging system of claim 33 wherein:

the user command means is configured to receive user commands representative of desired maximum image densities; and the digital processor further comprises means for generating and storing in RAM, user-customized transfer functions as a linear transformation of the accessed transfer functions and as a function of the user commands representative of desired maximum image densities.

35. The digital laser imaging system of claim 20 wherein the digital laser imaging system further comprises a plurality of input modules and wherein the transfer function memory is associated with the input modules, wherein each input module is configured to provide access to the digital laser imaging system by an associated user, and the transfer function memory associated with the input module includes memory for storing a plurality of user-specific transfer functions used by the associated user.

36. The digital laser imaging system of claim 35 wherein the film model memory is associated with the input modules, and wherein the film model memory associated with each input module includes memory for storing a plurality of film models used by the associated user.

37. The digital laser imaging system of claim 10 wherein:

the patch comparison means compares the difference between the actual density of the patch and the expected film density value to two or more density difference ranges; and the attenuator control means generates the attenuator control signals as a function of the density difference range to which the difference corresponds.

38. The digital laser imaging system of claim 24 wherein:

the patch comparison means compares the difference between the actual density of the patch and the expected film density value to two or more density difference ranges; and the attenuator control means generates the attenuator control signals as a function of the density difference range to which the difference corresponds.

39. A digital laser imaging system for imaging film as a function of digital image values representative of an image, comprising:

image data input means for receiving said digital image values;

film receiving means for receiving cartridges of film bearing film information in machine readable form;

film information reading means for reading the film information from cartridges loaded into the film receiving means;

laser scanning means, responsive to digital laser drive values, for scanning a laser beam to image said film;

a film processor for developing imaged film;

a densitometer for providing information representative of densities of portions of the developed film;

lookup table memory for storing lookup table data, the lookup table data representative of the relationship between the laser drive values and the digital image values;

density calibration memory for storing data representative of one or more laser drive values associated with expected film density values; and a digital processor coupled to the image data input means, film information reading means, laser scanning means, film processor, densitometer, lookup table memory and density calibration memory, and including means for:

accessing the density calibration memory and initiating the printing of one or more density calibration patches on said film;

causing the density calibration patches on the film to be developed by the film processor;

causing the densitometer to provide information representative of the actual density of the density calibration patches;

comparing the actual densities of the density calibration patches to the associated expected film density values;

generating the lookup table data as a function of the film information read from the cartridges and the comparison between the actual and expected densities of the density calibration patches; and accessing laser drive values in the generated lookup tables as a function of the image values, and providing the accessed drive values to the laser scanning means to image the film.

40. The digital laser imaging system of claim 39 wherein:

the film receiving means is configured to receive cartridges of film bearing film type information in machine readable form; and the digital processor means for generating the lookup table data generates the lookup table data as a function of the film type information read from the cartridges and the comparison between the actual and expected densities of the density calibration patches.

41. The digital laser imaging system of claim 39 wherein:

the density calibration memory stores test wedge data that is characteristic of a plurality of test wedges, the test wedge data being representative of a range of laser drive values associated with expected film density values;

the digital processor means for accessing the density calibration memory initiated the printing of the test wedges on the film;

the digital processor means for comparing densities compares the actual densities of the test wedges to the associated expected film density values; and the digital processor means for generating the lookup table data generates the lookup table data as a function of the film information read from the cartridges and the comparison between the actual and expected densities of the test wedges.

42. The digital laser imaging system of claim 41 and further comprising operator-responsive calibration request input means coupled to the digital processor for causing the digital processor to access the density calibration memory, initiate the printing of the test wedges on the film, compare the densities of the test wedges to the expected film density values and generate the lookup table data.

43. The digital laser imaging system of claim 41 wherein the digital processor further comprises means for causing the digital processor to access the density calibration memory, initiate the printing of the test wedges on the film, compare the densities of the test wedges to the expected film density values and generate the lookup table of data when a new lot of film has been loaded into the film receiving mechanism.

44. The digital laser imaging system of claim 41 wherein the digital processor further comprises means for causing the digital processor to access the density calibration memory, initiate the printing of the test wedges on the film, compare the densities of the test wedges to the expected film density values and generate the lookup table data when an elapsed period of time since a most recently imaged film exceeds a predetermined period of time.

45. The digital laser imaging system of claim 39 wherein:

the laser scanning means further comprises an attenuator for adjusting the intensity of the scanned laser beam in response to attenuator control signals;

the digital laser imaging system further includes density patch memory for storing data characteristic of a density patch, the density patch data representative of a digital laser drive value associated with an expected predetermined imaged and developed film density; and the digital processor is coupled to the attenuator and density patch memory and further comprises density patch calibration means having:

density patch calibration initiation means for accessing the density patch memory and initiating the imaging of a density patch on each film as a function of the laser drive data;

density patch processing means for causing the density patch on the imaged film to be developed by the film processor, and for causing the densitometer to provide information representative of the actual density of the developed patch;

patch comparison means for comparing the actual density of the patch to the associated expected film density value; and attenuator control means for generating attenuator control signals an a function of the patch comparison.

46. The digital laser imaging system of claim 45 wherein:

the density calibration memory stores test wedge data that is characteristic of a plurality of test wedges, the test wedge data being representative of a range of laser drive values associates with expected film density values;

the digital processor means for accessing the density calibration memory initiates the printing of the test wedges on the film;

the digital processor means for comparing the actual densities of the density calibration patches to the associated expected film density values compares the actual densities of the test wedges to the associated expected film density values;

the digital processor means for generating the lookup table data generates the lookup table data as a function of the film information read from the cartridges and the comparison between the actual and expected densities of the test wedges; and the digital processor accesses the density calibration memory, initiates the printing of the test wedges on the film, compares the densities of the test wedges to the expected film density values and generates the lookup table data as a function of the comparison between the actual and expected densities of the density patch.

*47. An imaging system for imaging film having machine readable film information, comprising:*

*a film receiving mechanism for receiving the film and reading the film information;*

*an input module for receiving digital image values representative of an image;*

*a scanning system responsive to laser drive values for scanning a laser beam to image the film;*

*lookup table memory for storing at least one lookup table defining a relationship between the received digital image values and the laser drive values; and*

*a processor for:*

*generating laser drive values from the lookup table as a function of the received digital image values and the read film information, and providing the laser drive values to the scanning system to image the film.*

*48. The imaging system of claim 47, wherein in processor selects the lookup table from a plurality of stored lookup tables as a function of the read film information.*

*49. The imaging system of claim 47, wherein the processor generates the lookup table as a function of read film information.*

*50. The imaging system of claim 47 further comprising:*

*transfer function memory for storing data characteristic of a plurality of transfer functions, each transfer function representative of a relationship between expected imaged film densities and associated digital image values; and*

*film model memory for storing data characteristic of a plurality of film models, each film model representative of a relationship between expected imaged film densities and associated laser drive values,*

*wherein the processor generates the lookup table as a function of the selected film model and at least one of the transfer functions.*

*51. The imaging system of claim 47, wherein the film information includes a film type.*

*52. The imaging system of claim 47, wherein the film information includes a film size.*

*53. The imaging system of claim 47, wherein the film is contained in a film container on which the film information is fixed.*

*54. The imaging system of claim 53, wherein the film container is a resealable film container.*

*55. The imaging system of claim 47, wherein the film information is present on a bar code label on a film container, and further wherein the film receiving mechanism includes a bar code scanner for reading the film information from the bar code label.*

*56. The imaging system of claim 47, wherein the imaging system is a medical imaging system.*

*57. An imaging system comprising:*

*an input module for receiving digital image values representative of a scanned image;*

*a scanning system responsive to drive values for scanning a laser beam to image film;*

*memory for storing a lookup table defining a relationship between the received digital image values and the laser drive values;*

*a densitometer for providing information representative of an optical density of the imaged film;*

*test wedge memory for storing test wedge data representative of a range of laser drive values; and*

*a processor for:*

*initiating a calibration of the imaging systems by providing the range of laser drive values from the test wedge memory to the scanning system to image a test wedge on the film;*

*controlling the densitometer to provide density information representative of actual densities of the imaged test wedges; and modifying*

*the lookup table as a function of the provided density information.*

*58. The imaging system of claim 57 further comprising:*

*a film receiving mechanism for receiving a container of film having machine readable information that is characteristic of the contained film, wherein the processor initiates the calibration of the imaging system according to the read film information and modifies the lookup table as a function of the provided density information.*

*59. The imaging system of claim 57 further comprising:*

*a film receiving mechanism for receiving a container of film having machine readable information that is characteristic of the contained film;*

*transfer function memory for storing data characteristic of a plurality of transfer functions, each transfer function representative of a relationship between expected imaged film densities and associated digital image values; and*

*film model memory for storing data characteristic of a plurality of film models, each film model representative of a relationship between expected imaged film densities and associated laser drive values, wherein the processor modifies the lookup table by:*

*selecting one of the film models based on the read film information, updating the film model according to the provided density information, and generating the lookup table as a function of the selected film model and at least one of the transfer functions.*

*60. The imaging system of claim 57 further comprising a film receiving mechanism for receiving a container of film having machine readable information that is characteristic of the contained film, wherein the processor selects the lookup table for modification from a plurality of stored lookup tables as a function of the machine readable information.*

*61. The imaging system of claim 57, wherein the imaging system is a medical imaging system.*

*62. A method for forming an image on film comprising the steps of:*

*receiving film having machine readable film information therewith; reading the film information;*

*receiving digital image values representative of a scanned image;*

*generating laser drive values from a lookup table as a function of the received digital image values and the read film information, wherein the lookup table defines a relationship between the received digital image values and the laser drive values; and*

*providing the laser drive values to a scanning system responsive to drive values for scanning a laser beam to image the film.*

*63. The method of claim 62, wherein the step of reading film information includes the step of reading a film type.*

*64. The method of claim 62, wherein the step of reading film information includes the step of reading a film size.*

*65. The method of claim 62, wherein the step of generating laser drive values comprises the step of generating the lookup table as function of the read film information.*

*66. The method of claim 62, wherein the step of generating laser drive values comprises the steps of:*

*selecting a transfer function from a plurality of transfer functions representative of a relationship between expected imaged film densities and associated digital image values;*

*selecting a film model from a plurality of film models based on the read film information, wherein the film model representative of a relationship between expected imaged film densities and associated laser drive values; and*

*generating the lookup table as a function of the selected film model and the selected transfer function.*

*67. The method of claim 62, wherein the step of generating laser drive values includes the step of selecting the lookup table from a plurality of lookup tables based on the read film information.*

*68. The method of claim 62, wherein the reading step comprises the step of reading the film information from a film container on which the film information is affixed.*

*69. The method of claim 62, wherein the imaging system is a medical imaging system.*

*70. A method for automatically calibrating an imaging system having an input module for receiving digital image values representative of a scanned image and a laser system for imaging the film in response to laser drive values, the method comprising the steps of:*

*automatically initiating a calibration of the imaging system based on a detected change in an imaging parameter;*

*accessing test wedge data representative of a range of laser drive values;*

*providing the range of laser drive values to the laser scanning system to image a test wedge on the film;*

*controlling a densitometer to provide density information representative of actual densities of the imaged test wedge; and*

*modifying a lookup table as a function of the provided density information, wherein the lookup table defines a relationship between the received digital image values and the laser drive values.*

*71. The method of claim 70, wherein the initiating step further comprises the steps of detecting a received container of film having machine readable information that is characteristic of the contained film and reading the machine readable film information, and further wherein the modifying step includes the step of selecting the lookup table to be modified from a plurality of stored lookup tables based on the machine readable information.*

*72. The method of claim 70, wherein the initiating step further comprises the steps of detecting a received container of film having machine readable information that is characteristic of the contained film and reading the machine readable film information, and further wherein the modifying step includes the step of modifying the lookup table as a function of the read film information and the provided density information.*

*73. The method of claim 70, wherein the modifying step further comprises the steps of:*

*receiving a container of film having machine readable information that is characteristic of the contained film;*

*reading the machine readable film information from the film container;*

*selecting a transfer function from a plurality of transfer functions, wherein each transfer function is representative of a relationship between expected imaged film densities and associated digital image values;*

*selecting a film model from a plurality of film models based on the read film information, wherein each model is representative of a relationship between expected imaged film densities and associated laser drive values;*

*updating the selected film model according to the provided density information; and*

*generating the lookup table as a function of the updated film model and the selected transfer function.*

*74. The method of claim 70, wherein the imaging system is a medical imaging system.*

*75. A method for imaging film with an imaging system having a scanning system responsive to drive values for scanning the film with a laser beam, the method comprising the steps of:*

*receiving a container of film having information in machine readable form;*

*reading the film information from film container;*

*receiving digital image values representative of a scanned image;*

*accessing density calibration data representative of one or more laser drive values associated with expected film density values;*

*providing the density calibration data to the scanning system to form a density calibration patch on the film;*

*controlling a densitometer to provide density information representative of actual densities of the density calibration patch;*

*modifying a lookup table as a function of the provided density information and the read film information, wherein each lookup table defines a relationship between the received digital image values and the laser drive values;*

*generating laser drive values from the modified lookup table based on the received digital image values; and*

*providing the laser drive values to the scanning system to form an image on the film.*

*76. The method of claim 75, wherein the modifying step further comprises the steps of:*

*comparing the provided density information to the associated expected film density values; and*

*modifying the lookup table as a function of the film information read from the cartridges and the comparison between the provided density information and the expected densities of the density calibration patches.*

*77. The method of claim 75, wherein the modifying step further comprising the step of selecting the lookup table to*

*be modified from a plurality of stored lookup tables based on the machine readable information.*

*78. The method of claim 75, wherein the modifying step further comprises the steps of:*

*selecting a transfer function from a plurality of transfer functions, wherein each transfer function is representative of a relationship between expected imaged film densities and associated digital image values;*

*selecting a film model from a plurality of film models based on the read film information, wherein each film model is representative of a relationship between expected imaged film densities and associated laser drive values;*

*comparing the provided density information to the associated expected film density values;*

*updating the selected film model according to the comparison between the provided density information and the expected densities of the density calibration patches; and*

*generating the lookup table as a function of the updated film model and the selected transfer function.*

*79. The method of claim 75, wherein the imaging system is a medical imaging system.*

*80. An imaging system for imaging film having machine readable film information, comprising:*

*a film receiving mechanism for receiving the film and reading the film information;*

*an input module for receiving input image values representative of an image;*

*an output module responsive to output image values for imaging the film;*

*lookup table memory for storing at least one lookup table defining a relationship between the received input image values and the output image values; and*

*a processor for:*

*generating output image values from the lookup table as a function of the received input image values and the read film information, and*

*providing the generated output image values to the output module to image the film.*

*81. An imaging system comprising:*

*an input module for receiving input image values representative of an image;*

*an output module responsive to output image values for imaging the film;*

*memory for storing a lookup table defining a relationship between the received input image values and the output image values;*

*a densitometer for providing information representative of an optical density of the imaged film;*

*test wedge memory for storing test wedge data representative of a range of output image values; and*

*a processor for:*

*initiating a calibration of the imaging system by providing the range of output image values from the test wedge memory to the output module to image a test wedge on the film;*

*controlling the densitometer to provide density information representative of actual densities of the imaged test wedges; and*

*modifying the lookup table as a function of the provided density information.*

*82. A method for forming an image on film comprising the steps of:*

*receiving film having machine readable film information therewith;*

*reading the film information;*

*receiving input image values representative of a scanned image;*

*generating output image values from a lookup table as a function of the received input image values and the read film information, wherein the lookup table defines a relationship between the received input image values and the output image values; and*

*providing the output image values to an output module responsive to output module responsive to output image values for imaging the film.*

*83. A method for automatically calibrating an imaging system having an input module for receiving input image values representative of an image and an output module for imaging the film in response to output image values, the method of comprising the steps of:*

*detecting a change in an imaging parameter;*

*accessing test wedge data representative of a range of output image values;*

*providing the range of output image values to the output module to image a test wedge on the film;*

*controlling a densitometer to provide density information representative of actual densities of the imaged test wedge; and*

*modifying a lookup table as a function of the provided density information and the detected change in the imaging parameter, wherein the lookup table defines a relationship between the received input image values and the output image values.*

*84. The method of claim 83, wherein the detecting step further includes the steps of detecting a received container of film having machine readable information that is characteristic of the contained film and reading the machine readable film information, and further wherein the modifying step includes the step of modifying the lookup table as a function of the read film information and the provided density information.*

* * * * *